Inventor
Edward F. Andrews
By Hinkle, Horton, Wilberg & Wupper,
Attorneys

SIGNAL TUNED RADIO APPARATUS

Filed Nov. 13, 1950 3 Sheets-Sheet 2

Inventor
Edward F. Andrews
By Hinkle, Horton, Ahlberg & Wupper,
Attorneys

SIGNAL TUNED RADIO APPARATUS

Filed Nov. 13, 1950 3 Sheets-Sheet 3

Inventor
Edward F. Andrews
By Hinkle, Horton, Ahlberg & Huffer
Attorneys 2,773,193

SIGNAL TUNED RADIO APPARATUS

Edward F. Andrews, Chicago, Ill., assignor, by mesne assignments, to General Motors Corporation, Detroit, Mich., a corporation of Delaware Application November 13, 1950, Serial No. 195,161

11 Claims. (Cl. 250—40)

This invention relates to signal tuned radio apparatus. Signal tuned radio receivers require no manual presetting to tune in progressively all transmitted signals of sufficient strength within the frequency tuning range of the receiver. Signal tuned radio apparatus has broad utility and is applicable to home receivers and other radio apparatus as well as automobile receivers and other receivers which are subject to frequent changes of geographical position.

Signal tuned receivers have also been known in the art as stop-on-signal, stop-on-carrier, or signal seeking receivers. Signal tuned apparatus of this general type has been described and claimed in other patents, such as those of E. F. Andrews Patent No. 2,493,741 and O. Gierwiatowski Patent No. 2,494,235, and in the E. F. Andrews, Patent No. 2,541,018 issued February 13, 1951. The present invention is applicable generally to resonant responsive electronic apparatus, but more specifically it constitutes an improvement on certain features of the signal tuned radio apparatus described in the above mentioned patents.

It is one of the objects of this invention to provide certain advantages over and improvements upon the structures shown in the patents above referred to. The solenoid, limit switch, and other parts associated with charging the tuner operating spring by electrical power are items of considerable cost. Occasionally they may also fail to operate properly in service. For instance, if the voltage of the car battery is sufficiently reduced and the limit switch operates to energize the solenoid, the force produced by the solenoid at this low voltage may be insufficient to effect operation and instead of the limit switch interrupting the current it remains closed and the solenoid continues to draw a considerable current which which could cause overheating and/or still further discharge of the storage battery. Although safeguards can be provided, they add still further to the cost.

According to one of the features of this invention, economy and reliability can both be enhanced by providing means for recharging the tuning drive spring manually at the end of each frequency band traverse or at any intermediate position. Manual recharging requires little effort and is necessary only infrequently because ordinarily from ten to fifty stations can be tuned before the spring must again be charged. Recharging may be performed by a further movement of the same control member which starts the tuner to tune in another station. This arrangement has the further advantage that by an appropriate movement of the control member the tuner can be moved in the spring charging direction any amount desired and this movement can be initiated while the tuner is in any intermediate position between the discharged and charged positions of the spring. With the structure shown in the above patents the spring charging operation is not initiated by the solenoid until the high frequency or spring-discharged end of the scale has been reached, and then the tuner is moved all the way to the low frequency or spring-charged end. During charging of the springs no means is provided for stopping at any intermediate position adjacent a desired station as can be done by the proper manual operation of the manual tuning and recharging control of this invention.

Likewise, with the solenoid recharged turner, if the starting switch is inadvertently operated the turner must go all the way to the high frequency end, all the way back to the low frequency end by the action of the solenoid, and then from the low frequency end toward the high frequency end to return to the desired station. With the manual recharging control, the control may be moved a very small distance sufficient to pass to the low frequency side of the desired station. If the control is then released the desired station will be immediately tuned in. If the operator knows the position of any desired station on the visual tuning scale, he can immediately tune it in in a single quick operation by this method. Experience has shown that this is often a very worth-while advantage, particularly when many stations of sufficient strength to operate the turner are present across the band.

One object of the present invention, therefore, is to provide an improved signal tuned or stop-on-signal radio apparatus.

Another object is to provide an improved signal tuned radio receiver.

A further object is to provide a new and improved signal tuned radio apparatus including variable tuning means, potential energy storage means for varying the tuning means, means for terminating variation of the tuning means by the potential energy storage means in response to a signal tuned by the tuning means, and manually operated means for recharging the energy storage means and for restarting the tuning means to tune in a different signal. The energy storage means is preferably a stressed spring means, but may be of some other suitable type such as piston or bellows subject to fluid pressure or an elevated weight.

A further object is to provide a compact, readily producible, signal tuned device in which the tuning mechanism is driven in one direction by a spring or other suitable energy storage means, and in which the energy storage means is recharged and the tuning mechanism simultaneously moved in the opposite direction by manually moving a charging and positioning member.

A further object is to provide a signal tuned device in which a small movement of a member causes the energy storage means to move the tuning means to tune in a station and a second small movement causes the tuning in of another station in the same way, while a larger movement of the same member causes the energy storage means to be recharged.

A further object is to provide a member manually rotatable in one direction to charge an energy storage means for varying the tuning means, and in which a short axial movement of an associated member causes the energy storage means to move the tuning means until the tuning means is signal tuned to another station, if the signal of a station is present and of required strength.

It is a further object to provide a signal tuned device with a member in which a short movement of the member effects the signal tuning of successive stations by a resilient driving means, and in which a larger motion of the member effects the recharging of said resilient means, and in which two-directional manual tuning, as differentiated from signal tuning, is accomplished by motions of the tuning member in opposite directions.

It is a further object to provide a signal tuned device, for instance any of those described in previous objects, with means by which the resilient means for varying the tuner may be recharged to any desired degree by a smaller or larger manual movement of a tuning member, and in which the tuning means is moved in one direction a small or a larger distance corresponding to the movement of the tuning member.

It is a further object to provide a signal tuned mechanism of the type previously described in which the tuner can be moved a desired distance in one direction and the tuner drive mechanism recharged not only when the tuner drive mechanism is completely discharged, but also at any intermediate position between charge and discharge.

Further objects, advantages and features of this invention will become apparent from the following description of several illustrative embodiments taken with the drawings in which.

Certain features of the apparatus disclosed in this application are not a part of this invention and will be disclosed and claimed in other copending applications.

Figures 1, 2:
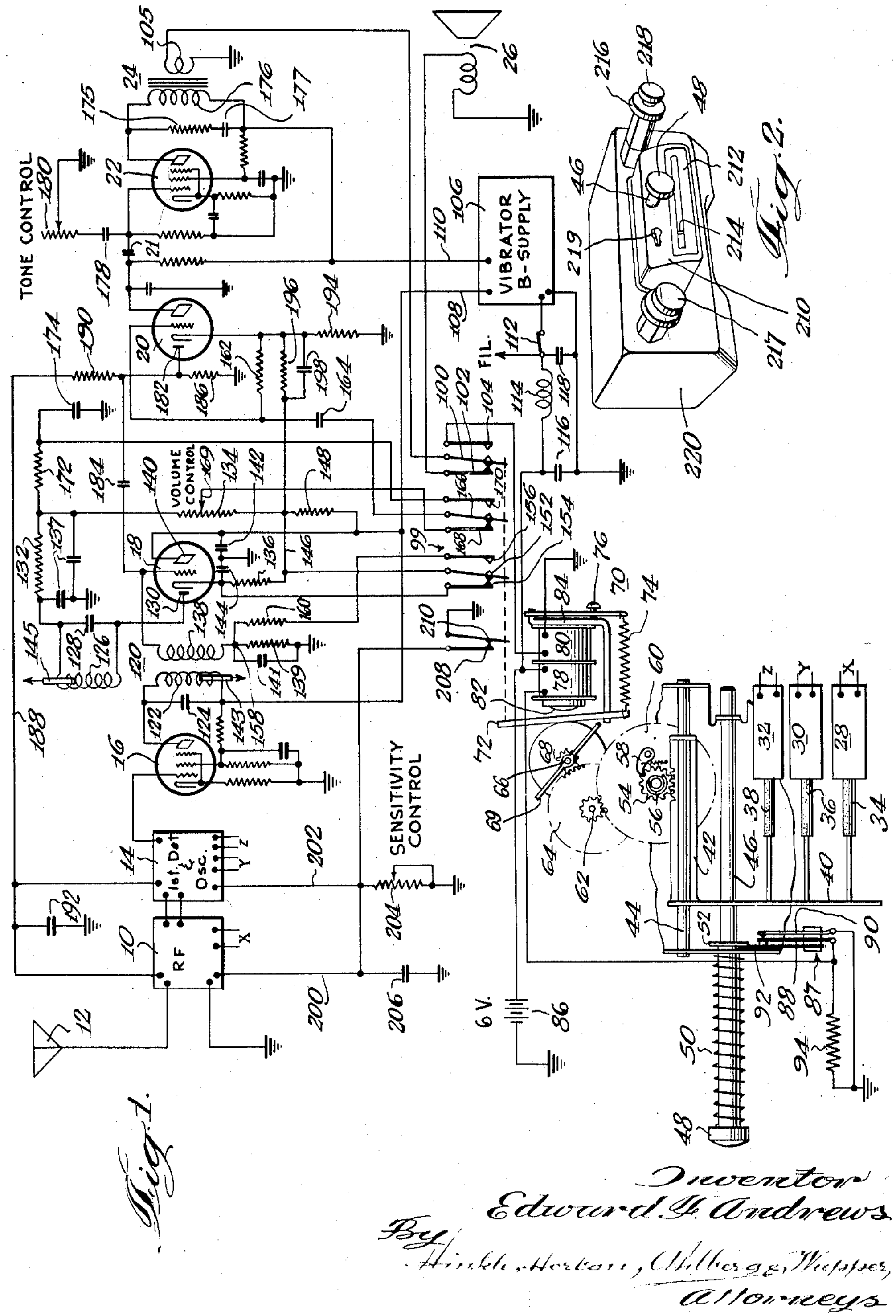
Fig. 1 is a diagrammatic view of an illustrative signal tuned radio receiver constructed in accordance with the invention.
Fig. 2 is a perspective view showing the external appearance of the receiver.

The signal tuned radio receiver illustrated in Fig. 1 has many of the components of the usual superheterodyne receiver. It has a radio frequency amplifier 10 with an input to which an antenna 12 may be connected. A superheterodyne converted stage 14 is coupled to the output of the R. F. amplifier 10. The converter 14 may include a first detector, an oscillator, and an I. F. input transformer for coupling the output of the first detector to an intermediate frequency amplifier tube 16.

The output of the I. F. tube 16 is coupled to a diode-triode tube 18 which functions as the detector for listening and as the actuating voltage rectifier for signal tuning. The output of the detector tube 18 is coupled to a first audio amplifier comprising a triode section of a second diode-triode tube 20, the diode section providing automatic volume control voltage. The output of the triode section of the tube 20 is coupled by a capacitor 21 to a second audio amplifier tube 22 having an output transformer 24 in its plate circuit. The tubes 20 and 22 function as amplifiers during both listening and signal tuning. A speaker 26 is provided for listening.

The receiver includes a radio frequency tuning inductance 28, a first detector tuning inductance 30, and an oscillator tuning inductance 32 which are connected with the corresponding portions of the circuit by means of pairs of leads X, Y and Z, respectively. For convenience and clarity only the end portions of the leads are shown. The inductance coils 28, 30 and 32 are mounted with their axes parallel. The coils are tunable by means of cores or slugs 34, 36 and 38 which are movable in an axial direction.

The tuning cores 34, 36 and 38 are mounted on a crosspiece 40 which is supported by a rack member 42. The rack 42 is slidably mounted on a supporting rod 44. The crosspiece is slidably guided by a pushrod or control plunger 46 to restrain the rack from rotation on the supporting rod 44 and to maintain alignment between the cores 34, 36 and 38 and the coils 28, 30 and 32. A knob 48 is provided on the front end of the pushrod 46 for manually pushing the rod inwardly, and a helical return spring 50 is positioned around the pushrod to urge it outwardly. A C-washer or abutment 52, mounted on the pushrod 46, is engageable with the front of the crosspiece 40 when the pushrod is pushed inwardly.

The rack meshes with a pinion 54. A coil spring 56 produces a clockwise torque on the pinion so as to urge the rack outwardly.

A spring pressed pawl 58 pivoted on a gear wheel 60 engages the pinion for transmitting clockwise rotation of the pinion to the gear 60. The gear 60 meshes with a pinion 62 fixed to a second gear wheel 64 which meshes with a pinion 66. The pinion 66 is fixed to a brake disc or stopping member 68. A wind vane 69 is carried by the stopping member 68 to control and stabilize the tuning speed by providing rapidly increasing resistance to rotation of the stopping member as its speed increases.

A relay 70 has an armature 72 which is urged toward the brake disc 68 by means of a spring 74. The tension exerted by the spring 74 may be adjusted by means of a screw 76.

The relay 70 has a pair of oppositely polarizable windings 78 and 80, the winding 78 operating to attract the armature 72 and the winding 80 operating to release the armature. The relay has a core 82 mounted in a frame 84. The magnetic circuit formed by the core 82, the frame 84 and the armature 72 has considerable retentivity so that the armature may be retained in attracted position by residual magnetism, once it has been moved to attracted or closed position by energization of the winding 78. Energization of the winding 80 releases the armature by bucking the residual magnetism.

The receiver is powered by a battery 86 which may be an automobile battery. The battery is utilized to energize the winding 78 for attracting the armature 72 to commence tuning. The attracting winding 78 of the relay 70 is connected across the battery 86 through a starting switch 87 comprising a pair of contact springs 88 and 90. The contacts 88 and 90 are normally held open by engagement of the washer 52 on the pushrod 46 with a spring member 92 mechanically connected with the contact spring 88 but electrically insulated therefrom. When the knob 48 on the pushrod is pushed inwardly, the washer 52 is disengaged from the spring member 92 and the spring member closes the contacts 88 and 90. The contacts are shunted by a bleeder resistor 94 which permits a small current to flow through the attracting winding 78 when the contacts are open to augment the residual magnetism and to provide an adjustment of the force tending to hold the armature in attracted or closed position. If the bleeder current or the retentivity of the magnetic material is suitably increased, the relay armature may be moved to closed position by a directly applied manual movement if desired. Under these circumstances the closing winding and the starting switch would be eliminated.

Energy for tuning the receiver is stored in the coil spring 56 by manually moving the knob 48 on the pushrod 46 inwardly. This produces inward movement of the rack 42 and rotates the pinion 54 counterclockwise to tension the coil spring. The pawl 58 ratchets over the teeth of the pinion so that the gear wheel 60 does not have to rotate while the spring is being charged.

When the spring 56 has been charged, tuning may be commenced by tapping the knob 48 to close the contacts 88 and 90 momentarily. When the contacts are closed, the winding 78 is energized to attract the armature 72 out of engagement with the stopping member or brake disc 68. After the contacts 88 and 90 are opened, the armature is held in attracted position by residual magnetism, magnetism produced by bleeder current through the resistor 94, or both.

When a signal is tuned in, an impulse from the output transformer 24 is impressed upon the releasing winding 80 to counteract the effect of the residual magnetism momentarily and to release the armature 72. After the armature is released, it is again engaged with the brake disc 68 by the spring 74, and tuning is stopped on the signal.

The relay 70 operates switch means 99 including a number of movable contacts. A movable contact 100 is movable between stationary contacts 102 and 104 for connecting a secondary winding 105 of the output transformer 24 with the speaker 26 when the armature 72 is released and with the releasing winding 80 when the armature 72 is attracted. Thus the output transformer is connected with the speaker for listening and with the releasing winding for tuning. Further details of the relay controlled tuning mechanism will be described below in connection with Figs. 3 through 8.

The means for producing an impulse for stopping the tuning of the receiver on a signal will now be described.

Plate voltage for the receiver is applied by a vibrator B supply 106 having two B+ output conductors 108 and 110. The B supply 106 is connected with the battery 86 through a switch 112 and an interference filter comprising a series inductance 114 and a pair of shunt capacitors 116 and 118.

An I. F. output transformer 120 couples the intermediate frequency amplifier pentode 16 with the detector tube 18. The transformer 120 has a primary winding 122 connected between the anode of the pentode 16 and the B supply conductor 108. The primary 122 is shunted by a capacitor 124 to form a tuned circuit.

A secondary tuned circuit comprising a secondary winding 126 in parallel with a capacitor 128 is coupled with the primary winding 122. One end of the tuned secondary winding 126 is connected to the anode 130 of the diode section of the tube 18. The other end of the secondary winding 126 is connected with the cathode of the diode-triode tube 18 through a series circuit including an intermediate frequency filtering resistor 132, a volume control and diode load resistor 134, and a cathode load resistor 136. Two intermediate frequency bypass capacitors 137 are connected respectively between the ends of the filtering resistor 132 and ground.

The I. F. output transformer 120 has an untuned secondary winding 138 which is closely coupled to the primary winding 122. The windings 122 and 138 may constitute a single winding of multiple strand Litz wire, some of the strands being used for the primary winding 122 and others being used for secondary winding 138. A ferromagnetic core 143 axially movable within the winding 122 may be provided to tune the primary circuit, comprising the winding 122 and capacitor 124, to resonance. The secondary winding 126 may be carried in axially spaced relation to the winding 122 and 138. A second ferromagnetic core 145 may be provided to tune the secondary circuit, comprising winding 126 and capacitor 128, to resonance. The coupling between the primary winding 122 and the secondary 126 may be changed, for instance, by adjusting the axial spacing of the two windings.

One end of the untuned secondary 138 is connected with the grid of the diode-triode tube 18, and the other end is connected to ground through a resistor 139 shunted by a bypass capacitor 141. The triode section of the tube 18 is connected as an infinite impedance rectifier. The triode anode 140 of the tube 18 is connected directly with the B supply conductor 108 and is bypassed to ground by a capacitor 142. The resistor 136 serves as a load resistance for the triode section of the tube 18. This resistor also provides resistance coupling between the triode and diode circuits of the tube 18. The cathode is bypassed to ground through an intermediate frequency bypass capacitor 144. In order to furnish cathode bias voltages the conductor 146 which connects the volume control resistor 134 and the cathode load resistor 136 is connected with the B supply conductor 108 through a resistor 148.

A movable contact 152 operated by the relay armature 72 engages a stationary contact 154 to short out the cathode load resistor 136 when the armature is in its listening position in engagement with the brake disc 68. When the armature is in its turning position the movable contact 152 engages a stationary contact 156 to connect the conductor 146 with the junction 158 of the secondary winding 138 and the resistor 139 through a resistor 160. When the relay armature 72 is in listening position there is a large positive voltage on the cathode of the tube 18 supplied from lead 108 through the resistor 148, while the grid, which is connected to ground through resistor 139, is maintained substantially at ground potential.

When the relay armature is in the tuning position the cathode load resistor 136 is in the circuit. A delay bias for the triode section of the tube 18 is developed by the voltage drop across the resistor 160, which now establishes bias on the grid relative to the cathode by raising the voltage at junction 158 above ground. The current flowing from the B supply conductor 108 through the resistor 160 provides delay bias for the triode restraining voltage rectifier section of the tube 18.

The grid of the first audio amplifier triode section of the tube 20 is shunted to the cathode by a resistor 162. The grid is connected through a coupling capacitor 164 to a movable contact 166 operated by the relay armature 72. When the relay armature is in listening position, the movable contact 166 engages a stationary contact 168 connected with the slider 169 of the volume control 134. When the relay armature 72 is in the tuning position, the movable contact 166 engages a stationary contact 170 connected with the diode plate end of the volume control resistor 134 by an interference filtering resistor 172 and shunted to ground by an interference bypass capacitor 174. Thus different adjustments of the volume control have no effect during tuning.

The tube 22 is connected as a power amplifier. The output transformer 24 has a primary winding 176 which connects the anode of the tube 22 with the B supply conductor 110.

A series circuit comprising a tone control capacitor 178 and a variable tone control resistor 180 is connected between the grid of the tube 22 and ground.

The tube 20 has a diode anode 182 which is coupled to the untuned secondary 138 through an intermediate frequency coupling capacitor 184. The anode 182 is connected to ground through a load resistor 186 and to an automatic volume control line conductor 188 through an automatic volume control filtering resistor 190. A bypass capacitor 192 connects the AVC line 188 to ground. The AVC line is connected with the R. F. amplifier 10, the first detector forming a part of the converter stage 14, and through the I. F. input transformer with the grid of the I. F. pentode 16.

It is advantageous for both listening and tuning to prevent operation of the AVC on weak signals. This may be accomplished by providing a delay bias to prevent operation of the AVC rectifier at low signal inputs. By this means the full sensitivity of the receiver is available at low signal inputs while at high signal inputs the AVC operates in the usual manner to hold the output at a substantially constant level.

A cathode resistor 194 is connected between the cathode of the diode-triode tube 20 and ground. The cathode is connected through a voltage dividing resistor 196 shunted by a capacitor 198 to the conductor 146 and thence through the resistor 148 to the B supply conductor 108. The voltage drop across the resistor 194 provides an AVC delay bias.

The cathodes of the radio frequency amplifier tube and the first detector tube are brought out by conductors 200 and 202 which are connected to ground through a variable sensitivity control resistor 204 shunted by a by-pass capacitor 206. The conductors 200 and 202 are connected with a stationary contact 208 on the relay 70 which is shorted to ground by a movable contact 210 when the relay armature 72 is in listening position so that the sensitivity control is effective only during tuning.

In the operation of the receiver, the spring 56 may be charged initially by manually pressing the knob 48 on the pushrod 46 inwardly. The rack 42 is thereby moved rearwardly and the cores 34, 36 and 38 are moved into their respective coils 28, 30 and 32. The knob 48 is promptly released after it is moved inwardly. The attracting winding 78 closes the relay when the inward motion of the pushrod 46 permits the spring member 92 to close the contacts 88 and 90. Thus the relay armature 72 is attracted and the brake disc is released. The contacts 88 and 90 are opened when the pushrod is released, since the return spring 50 overcomes the force of the spring member 92.

The armature 72 is retained in attracted position by residual magnetism and/or by the magnetic field produced by the current through the bleeder resistor 94 passing through the attracting winding 78.

The spring 56 rotates the pinion 54 and thereby moves the rack 42 forwardly. Since the cores 34, 36 and 38 are moved out of their respective coils the receiver is tuned toward the high frequency end of the tuning range.

Returning now to the signal tuning circuits, as stated above, the coupling between the primary 122 and the secondary 126 is adjusted by moving one of the coils to increase or decrease the axial distance between them. A degree of coupling between these coils which gives very good results may be secured in the following manner.

First, the grid-cathode bias of the tube 18 should be adjusted so that the plate current of the tube is at cutoff with zero signal input. Then with a signal of moderate strength applied to the grid of the tube 16, the coupling is adjusted so that there is an appreciable voltage output from the diode section of the tube 18, measured, for instance, across the volume control resistor 134. The coupling is then reduced until this voltage substantially disappears. This means that the restraining voltage developed across the resistor 136 and applied to the plate 130 is substantially equal to the voltage applied to the plate 130 from the coil 126.

Next, the bias between the cathode and the grid of the tube 18 is increased by three or four volts to provide a delay bias. With this additional bias applied to the restraining voltage triode rectifier, an actuating voltage will appear across the resistor 134 as long as a signal is applied, for instance, to grid of the tube 16, as previously described. The voltage across the resistor 134 will increase as the applied signal increases until the applied signal equals the delay bias, after which there will be no further substantial voltage increase. Since the voltage output does not increase further with strong signals the width of the signal in terms of frequency does not undergo a further increase and both strong and weak signals are tuned closely to the center I. F. frequency.

The tuning response characteristic of the untuned secondary winding 138 is like that of the primary 122 and is somewhat broader than the response characteristics of the secondary tuned circuit comprising the winding 126 and the capacitor 128. The response of the untuned circuit should not be narrower than that of the tuned circuit. Consequently as a signal is approached a substantial signal voltage first tends to develop across the secondary 138 and then rises gradually in magnitude along a broad response curve. The signal voltage across the secondary 138 is applied to the grid of the triode section of the tube 18 to produce a positive rectified output voltage across the cathode load resistor 136 when the signal exceeds the delay bias supplied by the voltage drop across the resistor 160.

As the receiver is tuned more closely to the signal by the spring 56, a signal voltage begins to develop across the more sharply tuned secondary winding 126. Since the load resistor 136 is in series with the circuit connecting the diode plate 130 to the cathode of the tube 18, the rectified signal voltage across the resistor 136, due to the triode infinite impedance rectifier, biases the cathode positively with respect to the diode anode 130 and thereby restrains rectification by the diode until the voltage across the tuned secondary 126 exceeds the bias, due to the triode rectifier, across the resistor 136. The drop across the resistor 160, caused by current from the B supply, provides a delay bias which holds the grid a few volts negative relative to the cathode of the triode section of the tube 18. This delay bias prevents rectification in the triode rectifier and thus delays the buildup of the positive restraining voltage until the signal across the secondary 138 exceeds the delay bias. The restraining voltage retarded by the delay bias prevents strong stations from producing a tuning signal much higher and wider than the weaker stations, and together they provide relatively uniform response of the actuating circuit to signals of varying magnitude.

When the diode section of the tube 18 begins to conduct, a signal impulse is transmitted to the grid of the first audio triode section of the tube 20 through the static filtering resistor 172, the contacts 170 and 166, and the coupling capacitor 164. It will be seen that, although the signal from the diode section of the tube 18 follows the path through the static filter during tuning and through the volume control resistor 134 and slider 169 during listening, as determined by the position of the switch contact 166, the tuning and the listening signals nevertheless come from the same diode and also from the same tuned circuit consisting of the inductance 126 and capacitor 128. As a result, the last tuned circuit that establishes the frequency for signal tuning is also the last tuned circuit which establishes the frequency of the signal during listening. Although during tuning the width of the response of this tuned circuit is narrowed, particularly to strong signals, the center frequency is the same as during listening. This eliminates possible error in tuning which might occur if a different tuned circuit were employed for tuning and listening, where one circuit could get out of tune with respect to the other.

The impulse is amplified by the first audio triode and the power amplifier tube 22 and is supplied to the relay releasing winding 80 by the secondary 105 of the output transformer 24. This impulse is of relatively low frequency and, therefore, it is desirable that the output transformer be of such construction as to provide effective power output at low frequencies. For similar reasons, the coupling condenser 21 should also be of sufficient capacity. A resistor 175 and a capacitor 177 are provided to improve sensitivity and proper relay action. The secondary of the output transformer and the releasing winding 80 are polarized with respect to the attracting winding 78 so that the first signal impulse through the releasing winding bucks or counteracts the residual magnetism and/or the magnetism caused by the current in the attracting winding 78 through bleeder 94. If the impulse is of suffijcient strength, the relay armature 72 is released and tuning is discontinued by engagement of the armature with the brake disc or stopping member 68.

The magnitude of the holding current through the bleeder resistor 94 is one of the factors determining the sensitivity of the relay 70. The sensitivity generally is increased if the bleeder current is decreased. The retentivity of the core 82, the armature 72 and the frame 84, as well as the strength or adjustment of the armature spring 74, also affect the sensitivity.

The adjustment of the sensitivity control resistor 204 determines the strength of the signal necessary for stopping the tuning of the receiver on a signal. The operation of the tuning mechanism is not affected by the setting of the volume control resistor 134 because the slider 169 of the volume control is disconnected during tuning, and the signal output is taken through the interference filtering resistor 172 from the end of the volume control resistor connected with the diode anode 130. During tuning, the resistor 172 and the capacitor 174 provide additional filtering to minimize the possibility of the tuner being stopped by static or other interference. This filter does not appreciably affect the audio response during listening.

When the relay armature 72 has been released to stop the tuning, the movable relay contacts shift to their listening positions. The movable contact 210 shorts out the sensitivity control resistor 204 so that the full sensitivity of the receiver controlled by the AVC is available for listening.

During listening the movable contact 152 shorts out the cathode load resistor 136 to prevent any signal voltages from developing across this resistor, and to permit the full signal voltage to develop across the volume control resistor 134. The triode section of the tube 18 is cut off by disconnecting the resistor 160 from the positively charged conductor 146, thus permitting the grid of the triode section to drop to ground potential. The conductor 146 is at a positive potential high enough to effectively prevent rectification in the triode restraining voltage rectifier with the strongest signal input.

For listening, the movable contact 166 connects the input of the first audio tube 20 to the slider 169 of the volume control resistor so that the slider may be adjusted to vary the volume.

Fig. 2 illustrates the external appearance of the receiver. The pushrod or control plunger 46 protrudes through a panel 210 enclosing the front of the receiver. A dial or scale 212 having an indicator 214 is positioned immediately below the pushrod 46. The volume control resistor 134 and the battery switch 112 may be controlled by a knob 218, and the tone control resistor 180 may be controlled by a ring 216. The sensitivity control may be controlled by a knob 217 and the receiver may be conditioned for manual or signal tuning by means of a lever 219. The receiver may be enclosed in a housing 220 and may be adapted for mounting on the dash of an automobile.

Some of the mechanical features of the embodiment of Fig. 1 are illustrated in greater detail in Figs. 3 through 8. The relay controlled tuning mechanism is mounted on a sheet metal subchassis or base 222. The pinion 54 and the gear wheel 60 are independently rotatably carried on a shaft 224 fixed at its lower end to the subchassis 222. The spring 56 is coiled around the shaft 224 outside the upper end of the pinion. The upper end of the spring is attached to a setscrew 223 which clamps a collar 225 to the upper end of the shaft, and the lower end of the spring is attached to the pinion 54. The tension on the spring may be adjusted by rotating the collar on the shaft. The spring 56 is initially tensioned or loaded to such an extent that the change in the tension of the spring caused by movement of the rack 42 over its entire range is relatively small with respect to the initial tensioning. Consequently the torque exerted by the spring upon the pinion 54 is relatively constant over the entire range of motion of the pinion and the rack. This constructional feature is important to obtain adequate torque or force for starting and running the tuner over the entire tuning range, wtih a minimum force and movement required for recharging the spring and a minimum restraining force for regulating the speed.

The stopping member or brake disc 68 is fixed to a shaft 226 which is rotatably carried at its lower end by the subchassis 222 and at its upper end by a bracket 228. The wind vane 69 is attached to the upper end of the shaft 226 above the bracket 228. The wind vane controls and stabilizes the tuning speed by providing rapidly increasing resistance to the rotation of the shaft 226 as the speed increases. Because of the high gear ratio between the pinion 54 and the stopping member 68 the wind vane rotates at a considerable speed during tuning and the speed regulation produced by the small wind vane is quite effective. The great mechanical advantage provided by the gear train between the stopping member 68 and the pinion 54 increases the effectiveness and accuracy of the braking action of the armature 72 when it engages the stopping member 68 and does not require excessive tension of the spring 74. Very positive holding of the drum can also be had by providing the drum with teeth and the armature with an abutment to engage the teeth. However, the teeth must be spaced so that the distance between adjacent teeth is small enough so that it has no important effect on the tuning.

The rack 42 and the crosspiece 40 may be integrally formed from sheet metal. A pair of brackets 232 and 234 which are bent upwardly from the rack near its ends are apertured for sliding engagement with the supporting rod 44, the rod being mounted on the subchassis 222.

The crosspiece 40 includes a separate member 236 for supporting the tuning cores 34 through 38. The core supporting member 236 is mounted on a downwardly bent bracket 238 on the crosspiece 40. The core supporting member 236 extends downwardly a short distance and then at right angles underneath the subchassis 222 in a horizontal direction. Thus the cores and the tuning coils 28 through 32 are positioned underneath the subchassis which supports the relay controlled driving mechanism. The cores extend rearwardly from the core supporting member 236.

In Fig. 1, for the purpose of diagrammatic illustration, the coils 28 through 32, the cores 34 through 38, and the portion of the crosspiece 40 which supports the cores, have been folded upwardly to bring them into view.

The pushrod or control plunger 46 is slidably carried on a rear bracket 240 bent upwardly from the subchassis 222 and on a bushing 242 mounted on an upwardly bent flange 244 at the front of the subchassis. The return spring 50 is coiled around the portion of the control pushrod 46 which extends in front of the bushing 242, and the spring bears at its opposite ends against the bushing and the knob 48.

The portion of the pushrod 46 in front of the C-washer or abutment 52 is provided with screw threads 246 which are engageable with a flat dog 248 mounted on the front of the chassis flange 244 for horizontal sliding movement. A coil spring 250, extending between spring ears 252 and 254 on the dog and the flange respectively, urges the dog toward engagement with the screw thread.

Figures 7, 8, 9, 10, 11, 12, 13:
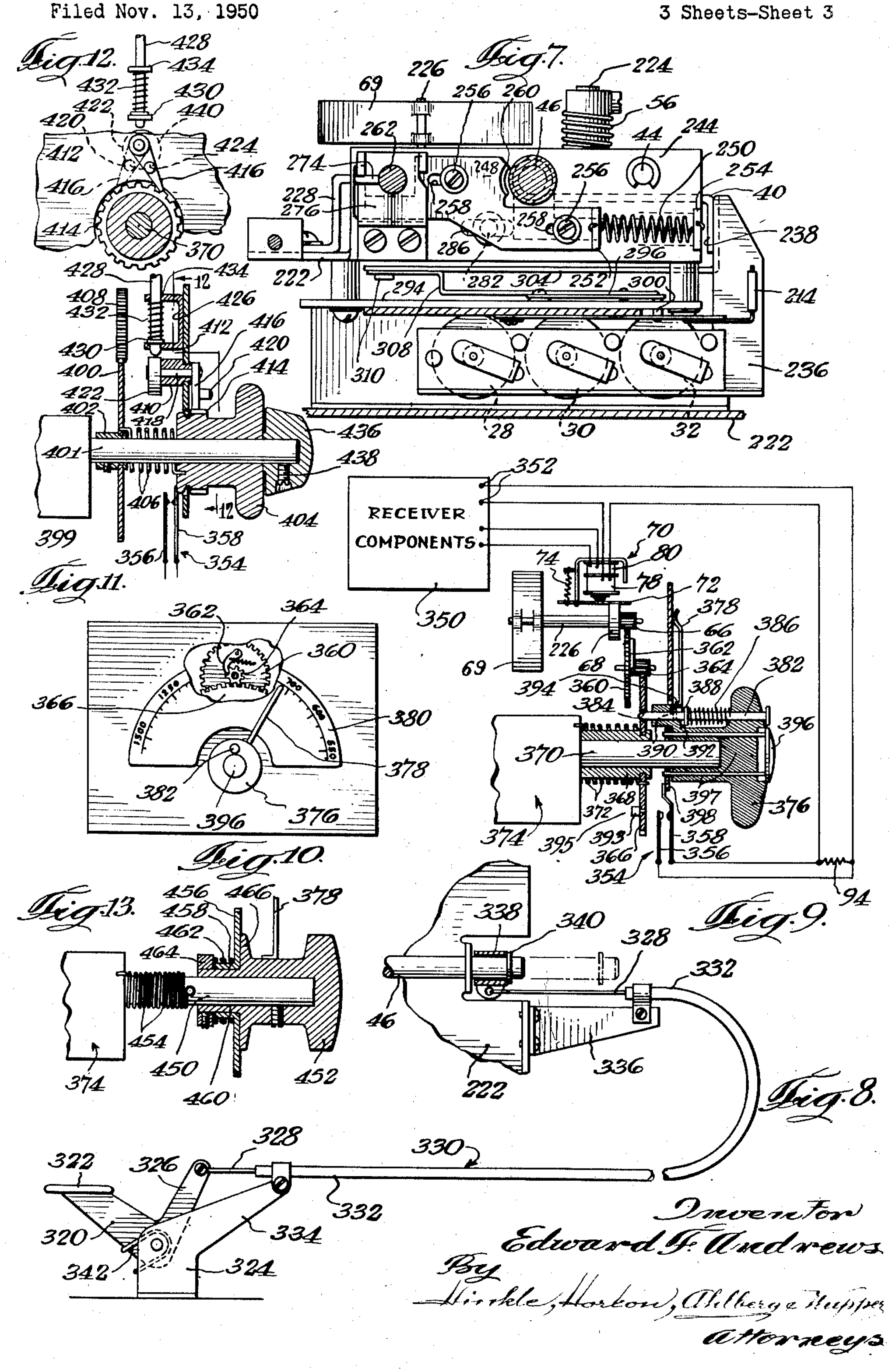
Fig. 7 is a front elevational sectional view taken on the line 7—7 of Fig. 4.
Fig. 8 is a partly diagrammatic view illustrating a foot operated control mechanism forming a part of the embodiment.
Fig. 9 is a diagrammatic side elevational sectional view illustrating a modified embodiment.
Fig. 10 is a fragmentary front elevational view illustrating the external appearance of the embodiment of Fig. 9, a portion of the external wall of the receiver being broken away to illustrate mechanical details.
Fig. 11 is a fragmentary elevational sectional view illustrating another modified embodiment.
Fig. 12 is a fragmentary sectional view taken on the line 12—12 of Fig. 11.
Fig. 13 is a fragmentary elevational sectional view illustrating a modification of the embodiment of Figs. 9 and 10.

As clearly shown in Fig. 7, the dog 248 is mounted on the flange 244 by two screws 256 extending through horizontal slots 258 in the dog.

Figures 3, 4, 5, 6:
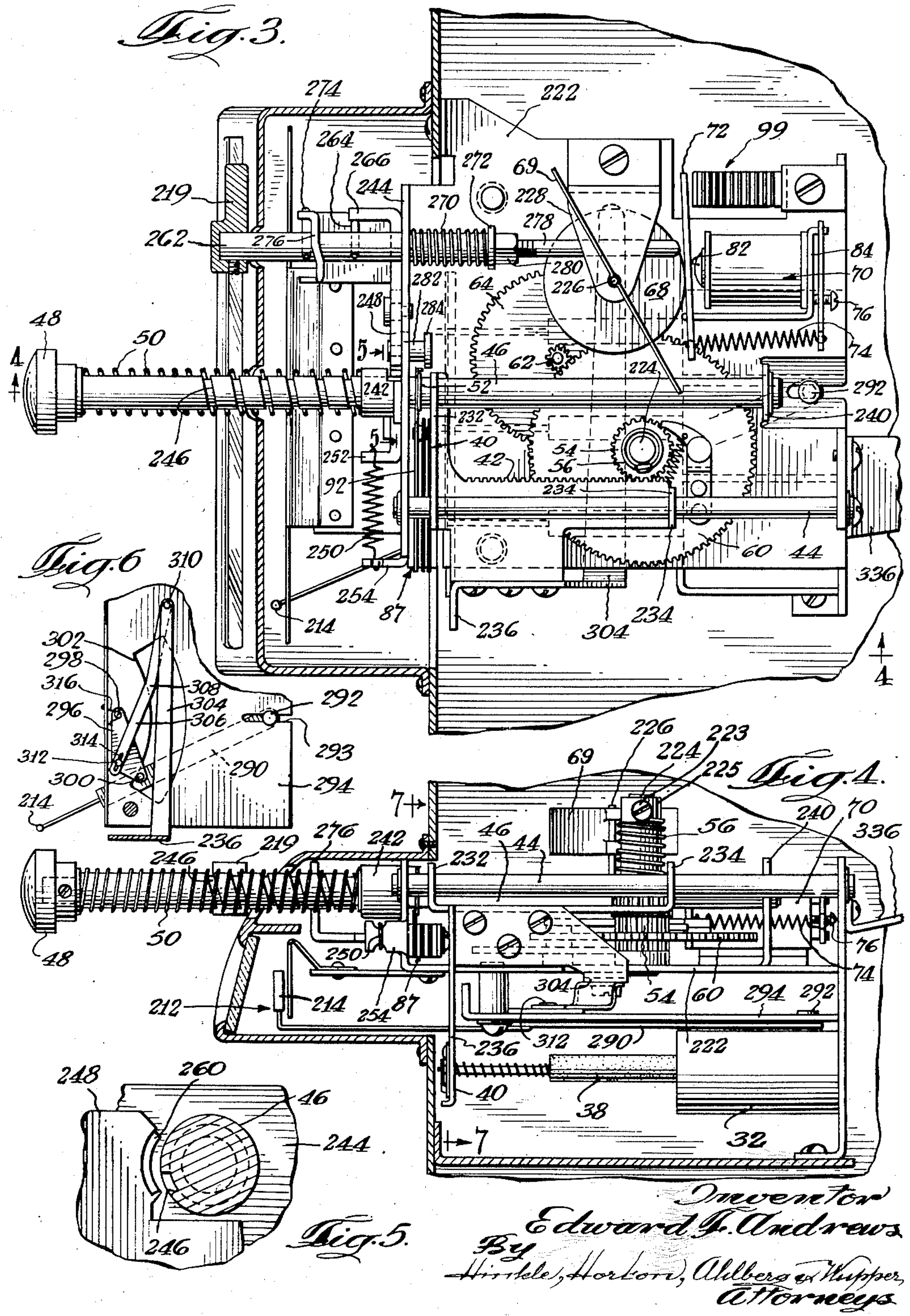
Fig. 3 is a fragmentary plan sectional view illustrating some of the mechanical features of the embodiment.
Fig. 4 is a fragmentary elevational sectional view taken on the line 4—4 of Fig. 3.
Fig. 5 is a fragmentary elevational sectional view taken on the line 5—5 of Fig. 3.
Fig. 6 is a fragmentary plan view illustrating some of the details of the dial indicator linkage.

As best shown in Fig. 5, the dog 248 has an arcuate transversely sloped edge 260 shaped to engage the screw thread 246 snugly.

The dog 248 is slidable out of engagement with the threads 246 by means of a rotatable shaft 262 carrying a radial camming pin 264 which is engageable with an outwardly bent flange 266 on the dog 248. The changeover handle or knob 219 is secured to the outer end of the shaft 262 for rotating the shaft to engage or disengage the pin 264 from the flange 266.

When the dog 248 is disengaged from the screw 246 by the pin 264, the pushrod 46 may be pushed inwardly by pressure exerted on the knob 48, to charge the coil spring 56 for signal tuning. When the dog is engaged with the screw threads 246 on the pushrod 46, the tuning may be adjusted manually by rotating the knob to turn the pushrod 46. Clockwise rotation of the knob 48, as viewed from the front, advances the pushrod 46 inwardly so that the abutment or C-washer 52 engages the crosspiece 40 and pushes the crosspiece and the rack 42 rearwardly.

In addition to being rotatable, the shaft 262 is slidable over a limited range. A coil spring 270 is compressed between the rear face of the flange 244 and a washer 272 mounted on the shaft to urge the shaft inwardly. A second radial pin 274 secured to the shaft engages a stationary camming member 276 which is shaped to engage the pin 274 for sliding the shaft 262 outwardly a short distance when the shaft is rotated to disengage the dog 248 from the threads 246 on the pushrod. When the shaft 262 is rotated to permit the dog 248 to engage the pushrod 46, the pin 274 rides down the camming member 276 and permits the spring 270 to slide the shaft 262 inwardly.

An extension rod 278, threaded on one end, is screwed into the rear end of the shaft 262 and retained by a locknut 280. When the shaft 262 slides inwardly the extension rod 278 engages the relay armature 72 and moves it out of contact with the stopping member 68. The stopping member 68 thereby is released so that the gear train is free to move during manual tuning. The extension rod 278 is adjusted with respect to the shaft 262 so that the inward motion of the extension rod is sufficient to disengage the armature from the stopping member 68 but is insufficient to shift the positions of the movable contacts of the switch means 99. Consequently the switch means 99 maintains its listening position during manual tuning. When the handle 219 on the shaft is rotated to disengage the dog 248 from the pushrod 46, the extension rod 278 moves forwardly out of contact with the relay armature 72 so that the relay armature engages the stopping member 68.

A post 282 having a flat head 284 extends from the rear side of the dog 248 through a horizontal slot 286 in the flange 244. When the dog 248 moves into engagement with the pushrod 46, the head 284 of the post 282 moves into the path of the extreme end of the spring 92, forming a part of the starting switch 87, to prevent the starting switch from closing when the washer or abutment 52 is disengaged from the spring member 92. The engagement of the head 284 with the spring member 92 prevents energization of the relay winding 78 and consequent closing of the relay during manual tuning.

The dial indicator 214 is connected with the tuning core supporting member 236 by means of a linkage illustrated diagrammatically in Fig. 6. The indicator 214 is mounted on an arm 290 having a pivot 292 at its rear end engaging a front to back slot 293 in the rear edge of a plate 294 mounted below the subchassis 222. The indicator arm 290 is positioned immediately below the plate 294. A triangular link 296 is mounted at one rear corner on a pivot 298 secured to the plate 294 near the center of its front edge and on its upper side. The other rear corner of the triangular link 296 is secured to the indicator arm 290 at an intermediate point by a pivot 300. The pivot 300 extends through a wide arcuate slot 302 in the plate 294.

The core supporting member 236 has an elongated horizontal arm 304 extending from right to left, as viewed from the front, between the subchassis 222 and the plate 294. The left end of the arm 304 is connected with the front corner of the triangular link 296 by a connecting member 306 having a lateral bend 308 at an intermediate point. The connecting member 306 is secured to the arm 304 by means of a pivot 310. A pivot 312 secured to the front corner of the triangular link 296 engages a longitudinal slot 314 in the connecting member 306. A coil spring 316 exerts a counterclockwise torque upon the triangular link as viewed in Fig. 6, in order to take up slack in the linkage.

The linkage converts the front to rear motion of the core supporting member 236 into a side to side motion of the indicator 214. The arrangement of the triangular link 296, the connecting member 306, and the slidable pivot 292 provides approximately straight-line motion of the indicator 214.

Fig. 8 illustrates means for controlling the tuning mechanism by foot movements. A foot lever 320, terminating at one end in a pedal 322 is pivoted on a stationary upright 324 mounted in a convenient location, such as on the floorboard of an automobile. The foot lever 320 has an upwardly extending arm 326 connected at its outer end with a flexible control wire 328 forming a part of a control cable 330. The control cable has an outer flexible sheath 332 which is clamped at one of its ends to an arm 334 extending from the upright 324.

The other end of the sheath is clamped to a bracket 336 mounted on the rear portion of the subchassis 222 which supports the tuning mechanism. A portion of the bracket 336 is illustrated in Figs. 3 and 4.

The other end of the control wire 328 is attached to a collar 338 slidably carried on the rear end of the control plunger or pushrod 46. The collar 338 is retained on the pushrod by an abutment which may be formed by a C-washer 340.

A coil spring 342 has its ends engaging the foot lever 320 and the upright 324 for exerting a clockwise torque upon the foot lever 320 to urge it into elevated position and the collar 338 forwardly on the pushrod 46.

The pushrod 46 may be moved inwardly to charge the spring 56 by depressing the pedal 322 on the foot lever 320. Depression of the pedal moves the collar 338 rearwardly until it engages the washer 340 and pulls the pushrod 46 rearwardly. When the spring 56 has been charged the pedal 322 may be tapped for moving the pushrod 46 inwardly a sufficient distance to operate the starting switch momentarily to initiate movement of the tuning mechanism.

The foot operating mechanism illustrated in Fig. 8 does not interfere with hand operation of the pushrod 46 since the pushrod slides freely through the collar 338 when the knob 48 is pushed inwardly by hand.

Many of the advantages of the embodiment of the invention illustrated in Figs. 1–8 have already been discussed. Recharging the spring 56 by pushing the knob on the control plunger inwardly requires little manual effort since the spring need be strong enough only to insure reliable starting. Recharging of the spring is necessary only after the entire tuning range has been traversed. This occurs infrequently since several stations spaced across the tuning range will ordinarily have sufficient strength for signal tuning in most localities.

If the station which is desired is inadvertently passed during signal tuning, by accidentally tapping the control knob, the knob may be pressed inwardly to move the tuning cores reversely a short distance just beyond the station accidentally passed. The amount the tuning cores are moved and the amount the spring is recharged are determined by the extent of the inward movement of the control knob. If the tuning cores have been moved manually some distance to the low frequency side of a desired station, the station may be tuned in by tapping the control knob repeatedly until the station is heard. The receiver dial may be observed during this procedure if the station cannot be identified by ear.

If the location of a desired station on the dial is known, the station may be tuned in quickly by pushing the control knob inwardly to tune the receiver to a point slightly on the low frequency side of the desired station as indicated on the dial. The desired station will then be signal tuned when the knob is released.

During signal tuning, the driving spring 56 continuously maintains a torque upon the pinion 54 and thereby takes up any slack in the gearing connecting the pinion with the stopping member 68. This feature substantially prevents any slack in the gearing from causing inaccurate signal tuning.

If desired, the apparatus of Figs. 1–8 may be modified slightly so that the driving spring also takes up any slack which may exist between the rack 42 and the pinion 54. This may be done by providing a separate pinion meshing with the rack 42. The torsional driving spring 56 is then connected to this separate pinion which drives the rack during tuning, taking up the play between the pinion 54 and the rack 42. The rack may be lengthened or otherwise modified for this purpose. A straight tension helical spring may also be employed acting linearly on the rack. Such a spring should be extended a long distance from zero tension position compared to the change in length that the spring undergoes in moving the rack from one end of its travel to the other.

A modified form of the invention is illustrated in Figs. 9 and 10. The modification relates particularly to the relay controlled spring operated mechanism for driving the tuning elements of the receiver. The other components of the receiver may be the same as in the embodiment of Figs. 1–8. These components are indicated in Fig. 9 by a box 350.

The embodiment of Fig. 9 includes the relay 70 as described above. The attracting winding 78 of the relay is energized from B supply terminals 352 of the receiver through a starting switch 354 having a pair of normally spaced apart contact springs 356 and 358.

The embodiment of Fig. 9 includes the stopping member or brake disc 68, the pinion 66 and the wind vane 69 mounted on the shaft 226 as previously described.

The pinion 66 meshes with a gear wheel 360 carrying a spring pressed pawl 362 which engages a pinion 364. The gear wheel 360 and pinion 364 are coaxial and independently rotatable. The pinion 364 meshes with a gear wheel 366 mounted on a hub 368 which is rotatable on a shaft 370. A spring 372, coiled around the hub 368, has its opposite ends secured to the gear wheel 366 and a stationary part of the tuning means 374. The shaft 370 is the control shaft of a variable gang condenser or other tuning means 374 forming a part of the receiver.

A control knob 376 supporting a radial indicator 378 is fixed to the outer end of the shaft 370. As shown in Fig. 10 the indicator is rotatable along a graduated dial 380.

The knob 376 is engageable with the gear wheel 366 by means of a pin 382 which may be inserted into a single aperture 384 in the gear wheel. A spring 386 coiled around the pin and compressed between the knob and an abutment washer 388 urges the pin toward engagement with the gear wheel 366. It may be disengaged by sliding the pin manually outwardly, and the pin may be retained in this position by rotating the pin until a radial finger 390 engages a shoulder 392 on the knob. When the pin 382 is engaged with the aperture 384 in the gear wheel 366, the finger 390 is positioned in a slot 394.

A stopping pin 393 on the gear 366 and a stationary abutment 395 which may be mounted on the tuning means 374 limit the rotation of the gear in the spring driven direction.

The starting switch 354 is operable by means of a push button 396 which may be supported at the center of the outer face of the knob 376 by means of a plurality of rods 397 extending longitudinally through the knob. A ring 398 positioned around the shaft 370 is secured to the inner ends of the rods 397. When the push button 396 is pushed inwardly, the ring 398 engages the front contact spring 358 of the starting switch for closing the latter. The spring of the contact moves it normally into the open switch position. The push button may be mounted on the panel of the receiver rather than on the knob if desired.

In operating the embodiment of Figs. 9 and 10 the driving spring 372 is charged by manually rotating the knob 376 in a clockwise direction. This rotates the pinion 364 in a counterclockwise direction. The pawl 362 is free to ratchet over the pinion so that the gear wheel 360 does not have to rotate. Consequently the armature 72 of the relay may remain in contact with the stopping member 368 during charging of the spring. In order to charge the spring the pin 382 must be engaged with the aperture 384 in the gear wheel 366.

Rotation of the knob 376 to charge the driving spring 372 also produces rotation of the tuning shaft 370 and thereby moves that tuning means 374 toward one end of its tuning range. The knob 376 may be rotated sufficiently to move the tuning means all the way to the end of its tuning range or only part way, as desired.

The change in the tension of the spring, produced by charging the spring, is relatively small with respect to the initial tension on the spring. Consequently the torque exerted by the spring is relatively constant throughout the tuning range of the receiver.

When the driving spring 372 is charged, the push button 396 may be tapped to close the starting switch 354 momentarily. This energizes the attracting winding 78 of the relay and releases the relay armature 72 from the stopping member 68 to commence tuning, as previously described in connection with the embodiment of Figs. 1–8. During tuning the gear wheel 366 drives the pinion 364 in a clockwise direction so that the pawl 362 is carried along to produce rotation of the gear wheel 360, the stopping member 68 and the wind vane 230.

As indicated, the releasing winding 80 may be connected with the receiver components indicated by the box 350 in the same manner as in the embodiment of Figs. 1–8. The relay 70 of the embodiment of Fig. 9 operates the switch means 99 as previously described.

When a signal of sufficient strength is tuned in, an impulse is impressed upon the releasing winding 80 to release the relay armature 72 and stop the brake disc 68. With respect to stopping, the pawl 362 forms a positive driving connection between the pinion 364 and the gear 360 so that the stopping of the brake disc 68 stops the tuning accurately on the signal.

The driving spring 372 maintains a torque upon the gear wheel 366 when the tuning is stopped on a signal so that any slack in the gear train is taken up.

When manual tuning is desired the pin 382 may be withdrawn from the gear wheel 366 as previously described. Rotation of the knob 376 then produces rotation of the tuning shaft 370 without charging the spring 372 or rotating the wind vane or brake drum. When the pin 382 is withdrawn, the spring driven tuning mechanism is entirely disconnected from the tuning shaft 370 so that it offers no resistance to the rotation of the knob 376.

In the event that the relay armature 72 releases the stopping member 68 while the pin 382 is withdrawn, the engagement of the stopping pin 393, on the gear 366, with the abutment 395 prevents complete unwinding of the spring 372 so that an initial tension is maintained on the spring. The gear stops at a position corresponding to one end of the tuning range of the receiver.

Other features of the construction and operation of the embodiment of Fig. 9 which have not been specifically described may be the same as described in connection with the embodiment of Figs. 1–8.

An embodiment representing a further modification is illustrated in Figs. 11 and 12. This embodiment is similar to the embodiment of Figs. 1–8 and Figs. 9–10 in many respects. The embodiment of Figs. 11 and 12 includes tuning means 399 which may be varied by rotating a shaft 401. A gear wheel 400 is mounted on a hub 402 which is fixed to the shaft 401. The gear wheel 400 may replace the gear 60 and mesh with the pinion 62 illustrated in Fig. 1.

A knob 404 is rotatable on the outer end of the shaft 401. A spring 406, coiled around the shaft 401, has its opposite ends attached to the gear wheel 400 and the knob 404. The knob is slidable inwardly against the resilient resistance of the spring 406 to engage the contact spring 358 and thereby close the starting switch 354.

The gear wheel 400 may mesh with a gear wheel 408 for operating an indicator of any suitable type.

A ratchet wheel 414 is fixed to the knob 404. A relatively long chisel pointed pawl 416 is movable into engagement with the ratchet wheel 414 for selectively restraining either clockwise or counterclockwise rotation of the knob. The pawl remains in engagement with ratchet wheel 414 due to gravity. The pawl is mounted on one end of a shaft 418 rotatably supported in a bushing 410 carried on a panel plate 412, the pawl being positioned on the front side of the panel plate. A pin 420, fixed to the pawl 416, is provided for moving the pawl manually into its various positions. An eccentric cam 422 is fixed to the other end of the shaft 418. This cam is provided with a notch 424.

A bracket 426 carried by the panel member 412 may be provided to support a rod member 428 for axial movement. A washer 430 is fixed to the rod 428. A compression spring 432 operates between one bracket member 434 and the washer 430 to urge the rounded end of the rod 428 toward the surface of the cam 422. A knob 436 is carried on the end of the shaft 401 and may be secured to the shaft by a set screw 438.

For manual operation the pawl 416 is disengaged from the ratchet wheel 414 and is moved into a vertical position as viewed in Fig. 12. Movement of the pawl 416 rotates the cam 422 which engages the end of the rod 428 and moves it upwardly against the force of the compression spring 432. When the pawl 416 reaches a vertical position the end of the rod 428 drops into the notch 424 in the cam 422. The force of the spring 432 holds the end of the rod 428 in engagement with the notch 424 in the cam 416 to retain the cam and the pawl 416 in position. The rod 428 of Fig. 12 corresponds to the rod 278 of Fig. 3 and operates in a similar manner to disengage the armature 72 of the relay 70 from the brake member 68 to permit free rotation of the gear train. However, the armature 72 is not moved enough to change the position of the switching means 99. After the pawl 416 is placed in the position as described above, manual tuning may be accomplished by rotating the knob 436 in either direction to tune in signals. Rotation of the tuning knob operates the tuning means 399, the indicator gear wheel 408 and the entire gear train which is driven by the gear wheel 400.

In another mode of operation of the embodiment the pawl 416 may be rotated from its vertical position to a position where the end of the rod 428 drops into a notch 440 in the cam 422. In this position the rod 428 moves downwardly to permit the relay armature 72 to effectively engage the brake disc 68. When the knob 404 is rotated in either direction, the spring 406 is charged. While the knob is held in twisted position, it is moved inwardly momentarily to close the starting switch 354 for releasing the relay armature 72 from the brake disc 68 to commence tuning movement of the shaft 401 by the spring 406. The tuning is stopped on a signal when an impulse from the receiver releases the relay armature as previously described. Thus the receiver may be manually tuned in either direction to the next adjacent station having sufficient strength to operate the control relay 70.

In another mode of operation of the embodiment the pawl 416 is rotated to engage with the ratchet wheel 414. The spring 406 may then be charged to a considerable extent by winding the knob 404 by successive twists. The spring may be wound in either direction depending upon whether the pawl is positioned to restrain clockwise or counterclockwise rotation of the ratchet wheel 414. When the spring is charged, the knob 404 may be moved inwardly momentarily to close the starting switch 354 and thereby to initiate movement of the tuning shaft 401 by the spring 406.

In some cases the shaft 401 for varying the tuning means 399 may be continuously rotatable. This may be the case when the tuning means comprises straight-line capacitance variable capacitors. Continuous rotation of the tuning means in a receiver having such capacitors varies the tuning across the entire tuning range alternately in opposite directions. A scale may be employed with graduations extending over a complete 360° of angular motion. If, for instance, a variable condenser is employed which can rotate only 180°, a corresponding scale or dial may be used. When the tuning shaft 401 is continuously rotatable, the knob 404 may be wound to charge the spring 406 to an extent sufficient to vary the tuning throughout several traverses across the tuning range. Thus winding or recharging is required less frequently.

Fig. 13 illustrates a modified form of the signal tuned radio receiver shown in Figs. 9 and 10. The modification of Fig. 13 permits manual tuning at any time during signal tuning without the operation of any disconnecting member such as the pin 382 in Fig. 9. Moreover signal tuning can be resumed after manual tuning without requiring any separate operation other than the tuning operation itself to effect the change.

In Fig. 13 the tuning means 374 of the receiver has a rotatable control shaft 450 which corresponds generally with the shaft 370 shown in Fig. 9. A knob 452 is fixed to the shaft 450. A spring 454, coiled around the shaft 450, has its opposite ends fixed to the shaft and to a stationary portion of the tuning means 374 respectively. The dial indicator 378 may be secured to the knob 452. For greater accuracy of manual tuning the knob 452 may be made larger. If desired a tuning scale may be marked on the knob and a stationary index provided.

A gear 456 has a hub 458 which is rotatably mounted on a stem 460 formed on the rear of the knob 452. A coil spring 462 is compressed between the gear 456 and a collar 464 fixed to the rear end of the stem. The spring urges the gear into engagement with a flange 466 on the knob 452. In the modification of Fig. 13 the gear 360 and the pinion 364 of Figure 9 are fixed together, for instance, by staking the gear 360 directly to one end of the pinion 364. The ratchet 362 is omitted. The push button 396 for operating the starting switch may be mounted on the panel of the receiver. Other details of the receiver of Fig. 13 may be the same as the embodiment of Figs. 9 and 10. The gear 458, which replaces the gear 366 of Fig. 9, may mesh with the pinion 364. The compression of the spring 462 may be such that when the armature brake 72 is applied by the spring 74 the friction of the slip joint will be sufficient to hold the shaft 450 in any position to which it is turned against the maximum torque of the spring 454. However, this friction should be insufficient to cause the slippage of the armature brake 72 when it is applied and the knob 452 is turned manually.

For signal tuning, the operation of the receiver illustrated in Fig. 13 is similar to the operation of the embodiment of Figs. 9 and 10. To minimize variation of spring torque over the entire tuning range, the spring 454 is given several turns so that its initial or minimum tension is large compared with the change in tension from one end to the other of the tuning range. The spring 454 tends to rotate the tuning shaft 450 in one direction which may be counterclockwise as viewed from the front of the receiver. The tension on the spring 454 is increased by manually rotating the knob 452 in the opposite direction. When the spring 454 is being manually charged the gear 456 is not rotated because the frictional drive between the gear and the flange 466 on the knob slips. Consequently the relay armature 72 may remain in contact with the brake disc 68 during charging of the spring.

When the spring 454 rotates the shaft 450 during signal tuning, the gear 456 turns with the knob 452 because the spring 462 is strong enough to provide sufficient friction between the gear and the flange 466 to prevent slippage of the gear. The gear 456 drives the stopping member 68 and the wind vane 69 until the stopping member 68 is stopped by the relay armature 72. The accuracy of the tuning is not affected by the frictional connection between the gear 456 and the knob 452 because the spring 462 is strong enough to prevent slipping when the tuning is stopped on a signal. Signal tuning is started by tapping the push button 396 as in the embodiment of Figs. 9 and 10.

For manual tuning, the knob 452 is turned to rotate the tuning shaft 450 to the desired position. When the knob 452 is turned in either direction to charge the spring 454 or to relieve tension on the spring, the knob slips with respect to the gear 456. Thus manual tuning may be accomplished although the relay armature 72 remains in contact with the brake disc 68 and holds the gear train stationary. The strength of the spring 462 is such that a moderate amount of manual effort is sufficient to produce slipping between the knob 452 and the gear 456 so that the gear may remain stationary while the knob is rotated.

The receiver illustrtaed in Fig. 13 has the advantage that either signal tuning or manual tuning can be accomplished without operating any changeover control. The receiver is manually tuned by merely rotating the knob 452 to the desired position. During manual tuning, the contacts operated by the relay 70 remain in their listening position. For signal tuning the spring is charged by rotating the knob manually, and then signals are tuned in by tapping the push button 396.

While I have shown and described several preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In signal tuned radio apparatus, variable tuning means, potential energy storage means connected thereto for varying said tuning means in one direction, manually movable means connected to said potential energy storage means for imparting manual energy thereto and for moving said tuning means in the opposite direction to positions corresponding to partial or full charge of said storage means, means operatively connected to said tuning means for terminating the variation of said tuning means in response to a signal tuned by said tuning means, means for starting variation of said tuning means, and remote means unidirectionally connected to said manual means whereby said manual means may be operated independently of said remote means while appropriate operation of said remote means effects partial or full charge of said storage means and corresponding positioning of said tuning means.

2. Signal tuned radio apparatus including a movable tuner, a spring coupled in driving relation to said tuner, means responsive to a signal tuned by said tuner for stopping said tuner while being driven by said spring, a manual control member operatively coupled to said tuner and spring for moving said tuner from one end of its frequency range to the other and for fully charging said spring by a single continuous manual movement of said member, unidirectional driving means between said tuner and said stopping means whereby said unidirectional means permits said tuner when stopped to be moved by said control member in spring charging direction only, and means effective to start the movement of said tuner by said spring in the opposite direction for signal tuning.

3. In radio receiving apparatus, movable means for tuning said apparatus over a predetermined band of frequencies, potential energy storage means connected to said movable means to move it in the tuning direction, means for starting variation of the tuning means, indexing stopping means operatively engageable with the movable means to stop the movable means upon receipt of a signal as it is moved by the potential energy storage means, manually movable means capable of moving the first-named movable means, operably engageable with said movable means to move the latter in opposition to the potential energy storage means to charge the latter to any degree at any time even when the indexing means is actuated to stop the tuner, and resilient means to normally maintain the manually movable means out of the path of movement of the first-named movable means when it is moved by the potential energy storage means but capable of being moved into engagement therewith at any position of the first-named movable means to move the first-named movable means any desired distance in the potential energy charging direction.

4. In radio receiving apparatus, movable means for tuning said apparatus over a predetermined band of frequencies, potential energy storage means connected to said movable means to move it in the tuning direction, indexing stopping means operatively engageable with the movable means to stop the movable means upon receipt of a signal as it is moved by the potential energy storage means, manually movable means capable of moving the first-named movable means operably engageable with said movable means to move the latter in opposition to the potential energy storage means to charge the latter to any degree at any time, and resilient means to normally maintain the manually movable means out of the path of movement of the first-named movable means when it is moved by the potential energy storage means but capable of being moved into engagement therewith at any position of the first-named movable means to move the first-named movable means any desired distance in the potential energy charging direction, and switching means connected to the indexing stopping means to control the latter operated by the manually movable means.

5. In radio apparatus, tuning means for tuning the apparatus over a predetermined frequency band, a reciprocating carriage upon which the tuning means is mounted, spring means connected to the carriage urging it in one direction, a gear train connected to said carriage and driven by movement thereof, a stopping member engageable with a part of the gear train to stop the same and index the carriage, a relay coil for actuating the stopping member, manually movable means, a second spring means for biasing said manually movable means in the same direction as the carriage is biased by its spring and means on said manually movable means engageable with said carriage at any position of the latter to move it against the spring which biases it but to move out of the path of travel of the carriage when it is released.

6. In radio apparatus, tuning means for tuning the apparatus over a predetermined frequency band, a reciprocating carriage upon which the tuning means is mounted, spring means connected to the carriage urging it in one direction, a gear train connected to said carriage and driven by movement thereof, a stopping member engageable with a part of the gear train to stop the same and index the carriage, a relay coil for actuating the stopping member, manually movable means, a second spring means for biasing said manually movable means in the same direction as the carriage is biased by its spring and means on said manually movable means engageable with said carriage at any position of the latter to move it against the spring which biases it but to move out of the path of travel of the carriage when it is released, and electrical switching means connected to said relay coil and engageable by said manually movable means to control the energization thereof.

7. In radio apparatus, means for tuning said radio apparatus over a predetermined band of frequencies, a carriage movable along a predetermined path on which said tuning means is mounted, resilient means for biasing said carriage in one direction, means moving with the carriage acting as a load on the same to limit the speed of travel, indexing means engageable with a part of the means moving with said carriage to stop the same at certain desired locations, reciprocable and rotatable means manually movable into engagement with said carriage to move the same against the resilient biasing means, said reciprocable and rotatable means having a spiral groove in its surface and an adjustably movable reactance member movable into said groove to act as a reactance surface and cause the rotatable and reciprocable member to move in and out upon rotation to adjust the position of the tuning means but capable of being moved to one side to permit full reciprocation of the reciprocable and rotatable means.

8. In radio apparatus, means for tuning said radio apparatus over a predetermined band of frequencies, a carriage movable along a predetermined path on which said tuning means is mounted, resilient means for biasing said carriage in one direction, means moving with the carriage acting as a load on the same to limit the speed of travel, indexing means engageable with a part of the means moving with said carriage to stop the same at certain desired locations, reciprocable and rotatable means manually movable into engagement with said carriage to move the same against the resilient biasing means, said reciprocable and rotatable means having a spiral groove in its surface, an adjustably movable reactance member movable into said groove to act as a reactance surface and cause the rotatable and reciprocable member to move in and out upon rotation to adjust the position of the tuning means but capable of being moved to one side to permit full reciprocation of the reciprocable and rotatable means, and manual means engageable with said reactance member and with said indexing means to move the former and the latter for manual tuning of the apparatus.

9. In radio apparatus, adjustable tuning means for tuning the apparatus over a predetermined frequency band, a reciprocable carriage upon which the tuning means is mounted, spring biasing means for biasing the carriage for movement in one direction, a reciprocating plunger engageable with said carriage to force it back against the spring biasing means, a second spring biasing means for biasing the plunger out of the path of movement of the carriage, a gear train connected to said carriage and driven by movement of the carriage under influence of said spring, indexing means engageable with a portion of the gear train and operable upon receipt of a signal in the apparatus to stop the train and index the position of the tuning means, and one way drive means in the gear train to permit the carriage to be moved in one direction by the plunger when the indexing means is holding the remainder of the gear train.

10. In radio apparatus, adjustable tuning means for tuning the apparatus over a predetermined frequency band, a reciprocable carriage upon which the tuning means is mounted, spring biasing means for biasing the carriage for movement in one direction, a reciprocating plunger engageable with said carriage to force it back against the spring biasing means, a second spring biasing means for biasing the plunger out of the path of movement of the carriage, a gear train connected to said carriage and driven by movement of the carriage under influence of said spring, indexing means engageable with a portion of the gear train and operable upon receipt of a signal in the apparatus to stop the train and index the postion of the tuning means, one way drive means in the gear train to permit the carriage to be moved in one direction by the plunger when the indexing means is holding the remainder of the gear train, said reciprocating plunger having a spiral groove in its surface and a reactance member movable into said groove to act as a reactant surface to force the plunger longitudinally as it is rotated.

11. In radio apparatus, adjustable tuning means for tuning the apparatus over a predetermined frequency band, a reciprocable carriage upon which the tuning means is mounted, spring biasing means for biasing the carriage for movement in one direction, a reciprocating plunger engageable with said carriage to force it back against the spring biasing means, a second spring biasing means for biasing the plunger out of the path of movement of the carriage, a gear train connected to said carriage and driven by movement of the carriage under influence of said spring, indexing means engageable with a portion of the gear train and operable upon receipt of a signal in the apparatus to stop the train and index the position of the tuning means, one way drive means in the gear train to permit the carriage to be moved in one direction by the plunger when the indexing means is holding the remainder of the gear train, said reciprocating plunger having a spiral groove in its surface, a reactance member movable into said groove to act as a reactance surface to force the plunger longitudinally as it is rotated, a cam engageable with said reactance member to move the same and an operating means for the cam engageable with the indexing means to move the latter to an inoperative position when the cam is moved to cause the member to move into the slot.

References Cited in the file of this patent

UNITED STATES PATENTS

| | | |
|---|---|---|
| 1,968,302 | Maurer | July 31, 1934 |
| 2,494,235 | Gierwiatowski | Jan. 10, 1950 |
| 2,499,573 | Dunn | Mar. 7, 1950 |
| 2,511,580 | Goodrich | June 13, 1950 |
| 2,512,714 | Carlzen | June 27, 1950 |